United States Patent Office

3,412,052
Patented Nov. 19, 1968

3,412,052
NOVEL FLAME RETARDANT PLASTIC COMPOSITIONS
Bert S. Taylor, New York, N.Y., and Martin R. Lutz, Arlesheim, Basel-Land, Switzerland, assignors to FMC Corporation, New York, N.Y., a corporation of Delaware
No Drawing. Application Oct. 15, 1963, Ser. No. 316,423, now Patent No. 3,325,563, dated June 13, 1967, which is a continuation-in-part of application Ser. No. 233,505, Oct. 25, 1962. This application Oct. 5, 1966, Ser. No. 608,237
6 Claims. (Cl. 260—25)

ABSTRACT OF THE DISCLOSURE

This application discloses the use of novel bis(bromohalopropyl) bromohalopropylphosphonates, whose bromohalopropyl radicals are selected from the group consisting of 1-bromo-3-halo-2-propyl, 2-bromo-3-halo-1-propyl and 2-halo-3-bromo-1-propyl, and corresponding polyphosphonates as flame retardants for cellulose acetate, polystyrene and polyolefin plastics.

---

This is a division of application Ser. No. 316,423, filed Oct. 15, 1963, now U.S. Patent 3,325,563.

This invention relates to novel flame retardants, and more particularly, to certain novel bis(bromohalopropyl) bromohalopropylphosphonates, the corresponding polyphosphonates, and to certain resin compositions containing these materials as flame retardants. This application is a continuation-in-part of our copending application Ser. No. 233,505, filed Oct. 25, 1962, now abandoned.

In recent years, chlorinated alkyl phosphates, such as tris(chloroethyl) phosphate, tris(bromochloropropyl) phosphate and tris(dibromopropyl) phosphate, have come into use as flame retardant additives for a wide variety of resin compositions. Although these phosphates are among the most effective flame retardants known, they must be used in relatively large amounts, generally more than about 10 parts by weight per 100 parts of resin, in order to provide non-burning resin compositions.

In the case of polyolefins, no suitable flame retardant has heretofore been found. Even the halogenated alkyl phosphates mentioned above are said to be unsuitable for use with polyolefins since they are not sufficiently compatible with these resins to be retained in the amount necessary to impart flame retardance.

It is an object of this invention to provide novel flame retardants which are effective in relatively small amounts in many resin compositions.

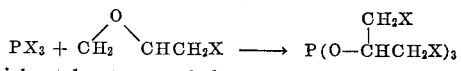

Another object is to provide effective flame retardants for polypropylene and polybutene.

These and other objects will become apparent from the following description of this invention.

The novel flame retardants of this invention are phosphonates selected from the group consisting of (1) bis(bromohalopropyl) bromohalopropylphosphonates in which the bromohalopropyl radicals are each selected from the group consisting of dibromopropyl and bromochloropropyl, and (2) polyphosphonates formed by intermolecular reaction of the corresponding phosphites. Quite surprisingly, we have discovered that these phosphonates are unusually effective as flame retardants for certain resin compositions, even when used in extremely small amounts. For some resin compositions, these compounds are by far the most effective flame retardants yet discovered. For example, as little as 0.5 part by weight, per 100 parts of resin, of bis(bromochloropropyl) bromochloropropylphosphonate renders cellulose acetate non-burning. In contrast, as much as 8 parts of tris(dibromopropyl) phosphate render the same resin only self-extinguishing. Although the phosphonates of this invention may be somewhat more expensive than the corresponding phosphates, quite surprisingly, the phosphonates are actually lower cost flame retardants since they can be used in substantially reduced quantities.

The novel flame retardants of this invention are prepared by first reacting phosphorus trihalide with epihalohydrin to form a tris(bromohalopropyl) phosphite in accordance with the following equation:

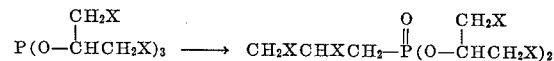

in which at least one of the reactants contains bromine and any remaining halogen is chlorine. Although the indicated structure represents a major portion of the product, it is also possible that in some of the product, one or more of the bromohalopropyl groups may be bromohalo-n-propyl of the structure —CH₂CHXCH₂X.

The phosphite intermediate is isomerized by heat, or an appropriate catalyst, to form the corresponding bis(bromohalopropyl) bromohalopropylphosphonate by intramolecular rearrangement in accordance with the equation:

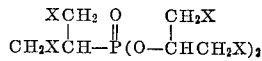

If one of the bromohalopropyl radicals in the phosphite is normal, as indicated above, and the n-propyl group is involved in the rearrangement, then the phosphonate will have the structure:

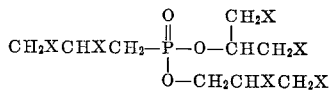

When the n-propyl group is not involved in the rearrangement, then the phosphonate has the structure:

$$\begin{array}{c} \text{O} \quad \text{CH}_2\text{X} \\ \| \quad | \\ \text{CH}_2\text{XCHXCH}_2{-}\text{P}{-}\text{O}{-}\text{CHCH}_2\text{X} \\ | \\ \text{O}{-}\text{CH}_2\text{CHXCH}_2\text{X} \end{array}$$

During the isomerization of the phosphite, a variable amount of isomerization takes place by intermolecular reaction of the phosphite to form primarily disphosphonate and a small amount of trihalopropane in accordance with the equations:

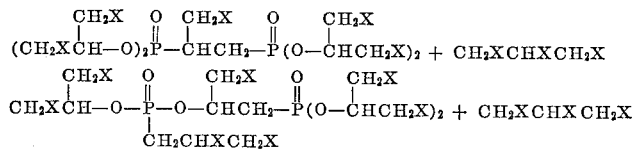

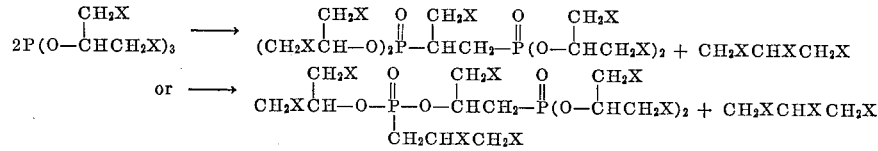

Although the exact structure of the diphosphonate is not certain, it is likely that either or both of the structures shown above are formed. It is also quite possible that a small amount of the disphosphonate reacts with further phosphite to form triphosphonate, etc. We intend the term "polyphosphonate" to include diphosphonate, triphosphonate, and higher intermolecular reaction products.

The actual amount of polyphosphonate formed during isomerization of the phosphite will depend upon such factors as temperature, solvent and catalyst. For example, when the isomerization is conducted thermally in a solvent-free system, about 67% of the phosphite isomerizes by intramolecular rearrangement to the corresponding phosphonate, while about 33% of the phosphite isomerizes by intermolecular reaction to form polyphosphonate and trihalopropane. We have found that the polyphosphonate has flame retardance properties essentially the same as those for the corresponding monophosphonate.

The tris(bromohalopropyl) phosphite intermediates are prepared by reacting phosphorus tribromide with epichlorohydrin or epibromohydrin, or by reacting phosphorus trichloride with epibromohydrin. In other words, all reactant combinations, except the combination of phosphorus trichloride and epichlorohydrin, lead to phosphites corresponding to the phosphonates of this invention.

The phosphite can also be prepared from mixed reactants such as a mixture of phosphorus tribromide and phosphorus trichloride with epibromohydrin, or phosphorus tribromide with a mixture of epibromohydrin and epichlorohydrin may also be used. When using such mixed reactants, the three bromohalopropyl radicals within a single molecule may be different. For example, when an equimolar mixture of phosphorus tribromide and phosphorus trichloride is used, the mixture redistributes itself to form about 1 mole of $PBr_3$, 3 moles of $PBr_2Cl$, 3 moles of $PBrCl_2$ and 1 mole of $PCl_3$. When this mixture reacts with epibromohydrin, the product contains one mole of tris(dibromopropyl) phosphite, three moles of bis(dibromopropyl) bromochloropropylphosphite, three moles of bis(bromochloropropyl) dibromopropylphosphite and one mole of tris(bromochloropropyl) phosphite.

We also contemplate the preparation of intermediate phosphites by reacting epichlorohydrin with mixtures of phosphorus tribromide and phosphorus trichloride containing at least an equimolar amount of phosphorus tribromide. For example, when an equimolar mixture of phosphorus tribromide and phosphorus trichloride is used, the product contains approximately 12.5 mole percent tris(bromochloropropyl) phosphite, 37.5% bis(bromochloropropyl) dichloropropylphosphite, 37.5% bis(dichloropropyl) bromochloropropylphosphite, and 12.5% tris(dichloropropyl) phosphite. We have found that such a mixed phosphonate product, in which about 25 mole percent of the halogen is bromine, is materially more effective than tris(dichloropropyl) dichloropropylphosphonate as a flame retardant for resin compositions.

Preparation of the phosphite intermediate by reaction of phosphorus trihalide and epihalohydrin is conveniently conducted at temperatures of about 0–105° C. At higher temperatures, the phosphite is formed, but it is isomerized to the phosphonate under these conditions. Catalysts such as titanium tetrachloride may be used, if desired. Solvents may also be used, if desired, but they do not appear to impart any special benefit. Preferably, the reaction is conducted thermally in the absence of catalyst or solvent. This type of reaction has previously been described by W. Lommel et al. in U.S. Patent No. 1,936,985. We have also found that this reaction is promoted by the use of a slight excess of epihalohydrin.

Isomerization of the phosphite to the phosphonate takes place at temperatures of about 105–200° C. when no catalyst is employed. Temperatures above about 200° C. should be avoided since they tend to cause degradation of the product. This type of isomerization reaction has been described by D. L. Kenaga et al. in U.S. Patent No. 2,725,311. When a catalyst such as 1% of iodine or methyl iodide is used, temperatures as low as about 70° C. may result in a substantial amount of isomerization. It has also been found that preparation of the phosphite by the simultaneous addition of phosphorus trihalide and epihalohydrin results in the formation of phosphonate at these lower temperatures. Preferably, the phosphonate is prepared directly from phosphorus trihalide and epihalohydrin in a single reaction step by the simultaneous addition of reactants in a solvent-free and catalyst-free system at temperatures of about 110–150° C. When an excess of epihalohydrin is used in the preparation of the phosphite, as suggested above, this excess can be removed from the phosphonate product by stripping. In some cases it may be desirable to conduct the isomerization reaction concurrent with the stripping by heating the phosphite to a suitable isomerization temperature and applying a vacuum. During the stripping step it is also possible to remove some or all of the by-product trihalopropane formed by intermolecular reaction of the phosphite. Since removal of this by-product tends to increase the viscosity of the product, it may be desirable to remove only a portion of it.

The novel phosphonates of this invention have unusual properties as flame retardants for certain resin compositions. They are particularly effective in the case of non-plasticized resins. In other words, these flame retardants prevent the burning of otherwise flammable resins but are not necessarily effective in preventing the burning of a volatile additive such as a plasticizer.

In the case of cellulose acetate, substantial reduction in flammability is achieved by the addition of as little as about 0.1 part by weight of flame retardant per 100 parts of resin. There is no advantage in adding more than about 10 parts of flame retardant since cellulose acetate compositions are non-burning at this level. Preferably, about 0.5–5 parts are used.

In addition to the novel flame retardants of this invention, we have found that other haloalkyl phosphonates, such as bis(dichloropropyl) dichloropropylphosphonate, bis(bromoethyl) bromoethylphosphonate, and bis(chloroethyl) chloroethylphosphonate are also effective as flame retardants for cellulose acetate. In each case however, the phosphonate is superior to the corresponding phosphate. The haloethylphosphonates are prepared by reacting phosphorus trihalide with ethylene oxide to form the phosphite which is isomerized to the corresponding phosphonate in the manner described above.

The novel flame retardants of this invention are also quite effective in polystyrene compositions when used in amounts of about 0.5–10 parts by weight, per 100 parts of polystyrene, and preferably about 1–5 parts. We have found that bis(bromoethyl) bromoethylphosphonate is also effective as a flame retardant for polystyrene. This phosphonate is especially effective in polystyrene rigid foams prepared from pre-expanded beads. Unlike most flame retardants bis (bromoethyl) bromoethylphosphonate is readily absorbed by pre-expanded beads and does not tend to cause collapse of the fully expanded beads during cure.

We have found that the novel phosphonates of this invention, as well as several other bromine-containing phosphorus compounds, are also effective as flame retardants in polypropylene and polybutene compositions. More particularly, we have found that bromine-containing phosphorus compounds selected from the group consisting of (1) bis(haloalkyl) haloalkylphosphonates in which the haloalkyl radicals are each selected from the group consisting of dibromopropyl, bromochloropropyl and bromoethyl, (2) the corresponding phosphates, (3) the corresponding phosphites, and (4) polyphosphonates formed by intermolecular reaction of the corresponding phosphites are excellent flame retardants for polypropylene and polybutene. This flame retardance is quite unexpected in view of the fact that these same compounds are completely ineffective for polyethylene. These compounds are surprisingly effective with polypropylene and polybutene at relatively low levels, of the order of a few percent, and well within the range of compatibility, so that compositions can be prepared from each of these compounds which are self-extinguishing without exhibiting any bloom or surface exudate of the liquid additive. Moreover, in the case of the preferred bis(bromohalopropyl) bromohalopropylphosphonates and polyphosphonates derived from the corresponding phosphites, non-burning compositions which exhibit no permanent bloom can be prepared.

This unusual effectiveness appears to be due to the unexpected compatibility of these compounds with the higher polyolefins, as compared with an apparent complete lack of compatibility with polyethylene. Such a sharp deviation between such closely allied products is most unusual.

Preferably about 2% by weight of the total composition of bis(bromohalopropyl) bromohalopropylphosphonate or polyphosphonate formed from the corresponding phosphite should be added to the resin to get self-extinguishing characteristics; somewhat higher loadings (3% to 5%) are needed for the other additives. This lower limit of flame retardant is generally sufficient to render the polymer self-extinguishing according to ASTM Method D568–56T. A more rigorous test, ASTM Method D635–56T, requires about 3% of phosphonate and 4 to 6% of the other additives. Thus, bis(bromohalopropyl) bromohalopropylphosphonates and polyphosphonates derived from the corresponding phosphites are more effective flame retardants at low loading levels than the others in the group.

The presence of even a very small amount of each of these flame retardants, such as about 0.5% by weight of the total composition, has a noticeable flame retarding effect upon polypropylene and polybutene. At high levels of addition some difficulty is encountered in mixing the additive into the resin, and bloom may become noticeable immediately after milling. In most cases, however, this condition is only temporary, unless excessive amounts are used. Hence, it is preferred to keep the amount of additive below about 15% and most preferably no more than 12%.

These bromine-containing phosphorus compounds also act to plasticize the polyolefin over a relatively wide temperature range. The treated resin is made more flexible, even at low temperatures, so that its embrittlement temperature is considerably lower than that of the resin alone. This effect is advantageous because it enables the resin to stand greater impact shocks under cold conditions than untreated resin. It is further surprising to find that even with this increased flexibility, there is little of the expected lowering in tensile strength or yield strength. These results are evidence of the extraordinary compatibility of these phosphorus compounds with polypropylene and polybutene.

The additives also contribute some lubricating effect to the resin with respect to the hot mill rolls used in compounding; polybutene, an especially difficult material to mill, can be easily removed from the mill rolls after the additives are mixed. The solid polymers of polypropylene and polybutene may be milled at temperatures in the range of 325–400° F. for 5–20 minutes, and preferably 15–20 minutes at 375° C. The polymer may be first banded on the hot mill rolls and then the liquid flame retardant is slowly poured over the polymer while the milling continues. When all of the additive has been uniformly incorporated into the polymer, it is slabbed off and is ready for final processing. Other types of mixers may, of course, be used, including the internal-type mixers. These polymers can be molded, calendered, or extruded, depending upon the desired use.

The following examples, illustrating the novel flame retardants and novel resin compositions containing flame retardants disclosed herein, are presented without any intention that the invention be limited thereto. All parts and percentages are by weight.

EXAMPLE 1

Bis(bromochloropropyl) bromochloropropylphosphonate was prepared as follows: About 0.3 mole of epichlorohydrin was charged to a reaction pot and heated to 90° C. About 1 mole of phosphorus tribromide and 3 moles of epichlorohydrin were simultaneously added slowly to the reaction pot over a period of about 1 hr. The exotherm temperature was allowed to rise to about 125° C. and held at this temperature for an additional 2 hrs. by cooling the pot. After this period the exotherm subsided, and cooling was discontinued. The reaction product at this point contained 92.9% phosphonate and 7.1% phosphite, and had a viscosity of 8.3 stokes at 25° C. The temperature was then raised to 155° C. and the pressure was dropped stepwise to 1–2 mm. Hg to strip out excess epichlorohydrin and about 0.17 mole of by-product dibromochloropropane. The final product contained about 1% of tris(bromochloropropyl) phosphite and about 99% of a mixture of monophosphonate and polyphosphonate, had a viscosity of 90 stokes at 25° C., an acidity of .010 milliequivalent of acid per gram, and a molecular weight of 611.

A portion of the bis(bromochloropropyl) bromochloropropylphosphonate was molecularly distilled at 250–270° C. at 20 microns of Hg until 40% by weight of the product had been recovered as distillate. This distillate was found to be pure bis(bromochloropropyl) bromochloropropylphosphonate having a molecular weight of 547 (theoretical molecular weight is 548) and a viscosity of 32 stokes at 25° C. The distillation residue was found to contain about 57% by weight polyphosphonate and 43% monophosphonate.

EXAMPLE 2

In a manner similar to Example 1, bis(dibromopropyl) dibromopropylphosphonate was prepared from phosphorus tribromide and epibromohydrin at 125° C. and stripped at 155° C. The undistilled product contained 98.1% phosphonate and 1.9% phosphite, and had an acidity of .013 milliequivalent of acid per gram.

EXAMPLE 3

In a manner similar to Example 1, a mixed bis(dihalopropyl) dihalopropylphosphonate reaction product was prepared from 3.3 moles of epichlorohydrin, 0.5 mole of phosphorus tribromide and 0.5 mole of phosphorus trichloride at 125° C. and stripped at 155° C. The reaction product contained a mixture of bis(dihalopropyl) dihalopropylphosphonates in which 25 mole percent of the halogen was bromine. This product was 91.6% phosphonate and 8.4% phosphite, and had an acidity of .010 milliequivalent of acid per gram.

EXAMPLE 4

Cellulose acetate compositions were prepared as follows: Films of 1.2–1.9 mils thickness were obtained by air evaporation of an acetone solution of various levels of phosphonate retardant plus a white filtered powder lacquer-type cellulose acetate having an acetyl content of 39.8% and a falling ball viscosity of 3 sec. (ASTM method D 1343–56). Each film was cut into 18-in. strips, 1 in. wide, and tested for flammability according to ASTM method D568–56T. In some cases additional strips, 5 mils thick, were prepared. The results of these tests are indicated in the following table in which the first 5 phosphonates are those prepared in Examples 1–3.

CELLULOSE ACETATE

| Retardant, parts per 100 parts resin | 0.5 | 2.0 | 4.0 | 8.0 |
|---|---|---|---|---|
| Bis(dibromopropyl) dibromopropylphosphonate | NB | NB | NB | NB |
| Bis(bromochloropropyl) bromochloropropylphosphonate | NB | NB [1] | NB [1] | NB |
| Distilled bis(bromochloropropyl) bromochloropropylphosphonate | | | NB | NB |
| Polyphosphonate derived from tris(bromochloropropyl) phosphite | | | NB | NB |
| Mixed bis (dihalopropyl) dihalopropylphosphonate | | | NB | NB |
| Bis(dichloropropyl) dichloropropylphosphonate | | | NB | NB |
| Bis(bromoethyl) bromoethylphosphonate | | | NB | NB |
| Bis(chloroethyl) chloroethylphosphonate | | | NB | NB |

[1] Strips 5-mils thick.
NOTE.—NB=Non-burning.

For comparison, some conventional phosphate flame retardants for cellulose acetate were evaluated in the same manner. The results were as follows:

CELLULOSE ACETATE

| Retardant, parts per 100 parts resin | 4.0 | 8.0 |
|---|---|---|
| Tris(dibromopropyl) phosphate | SE | SE [1] |
| Tris(bromochloropropyl) phosphate | SE | SE [1] |
| Tris(dichloropropyl) phosphate | SE | SE [1] |
| Tris(chloroethyl) phosphate | SE | SE [1] |

[1] Strips 5-mils thick.
NOTE.—SE=Self-extinguishing.

EXAMPLE 5

Polystyrene compositions were prepared as follows: Films of 1.2–1.7 mils thickness were obtained by air evaporation of a toluene solution of various levels of phosphonate retardant plus a conventional high heat resistant polystyrene having a specific gravity of 1.05 and a heat distortion temperature of 94° C. Each film was cut into 1-in. by 18-in. strips and tested by ASTM method D568–56T. The results of these tests are presented in the following table in which the first 4 retardants are those prepared in Examples 1–2.

POLYSTYRENE

| Retardant | Parts per 100 Parts Resin | | |
|---|---|---|---|
| | 2.0 | 4.0 | 8.0 |
| Bis(dibromopropyl)dibromopropylphosphonate | NB | NB | NB |
| Bis(bromochloropropyl) bromochloropropylphosphonate | NB | NB | NB |
| Distilled bis(bromochloropropyl) bromochloropropylphosphonate | | NB | NB |
| Polyphosphonate derived from tris(bromochloropropyl) phosphite | | NB | NB |
| Bis(bromoethyl) bromoethylphosphonate | | | SE |

For comparison, additional strips, 5 mils thick, were prepared containing bis(bromochloropropyl) bromochloropropylphosphonate and conventional phosphate flame retardants for polystyrene. A control containing no retardant was also tested. The following results were obtained.

POLYSTYRENE

| Retardant | Parts per 100 Parts Resin | |
|---|---|---|
| | 4.0 | 8.0 |
| Bis(bromochloropropyl) bromochloropropylphosphonate | NB | |
| Tris(dibromopropyl) phosphate | SE | SE |
| Tris(bromochloropropyl) phosphate | 13 [1] | |
| None | 16 [1] | |

[1] Burning rate, in. per min.

EXAMPLE 6

Polypropylene compositions were prepared as follows: Various levels of bromine-containing phosphorus flame retardants were blended with highly crystalline isotactic general purpose polypropylene having a nominal melt flow of 4.0 g. per 10 min. at 230° C., sold as Pro-fax 6523 by Hercules Powder Company, for 7 min. at 200° C. by the hot mix procedure. The resin compositions were then pressed for 5 min. at 340° C. into 0.02-in. thick sheets which were cut into strips 5 in. by 0.5 in. The strips were tested for flammability according to ASTM method D635–56T. The results of these tests are given in the following table in which the first 3 retardants are those prepared in Examples 1–3.

POLYPROPYLENE

| Retardant | Parts per 100 Parts Resin | | | |
|---|---|---|---|---|
| | 2.0 | 3.0 | 4.0 | 8.0 |
| Bis(dibromopropyl) dibromopropylphosphonate | | | NB | NB |
| Bis(bromochloropropyl) bromochloropropylphosphonate | NB | NB | NB | NB |
| Mixed bis(dihalopropyl) dihalopropylphosphonate | | | SE | |
| Bis(bromoethyl) bromoethylphosphonate | | | SE | |
| Tris(dibromopropyl) phosphate | NB | NB | NB | NB |
| Tris(bromochloropropyl) phosphate | NB | NB | NB | NB |

For comparison, each of the above 6 flame retardants was tested at the 4 part level in a conventional polyethylene sold by U.S. Industrial Chemicals Co. as Petrothene P-200. The resin compositions were blended for 7 min. at 190° C. by the hot mix procedure, pressed for 5 min. at 120° C. into 0.02-in. sheets and cut into strips 5 in. by 0.5 in. The strips were tested for flammability according to ASTM method D635–56T and found to burn faster than the control containing no retardant.

EXAMPLE 7

Bis(bromochloropropyl) bromochloropropylphosphonate was prepared as follows: Into a three-neck flask was stirred 2215 g. of phosphorus tribromide and 2 g. of TiCl$_4$. The temperature of the flask was held at 60–70° C. as 2300 g. of epichlorohydrin was slowly added dropwise over a 3-hr. period. External cooling was required to maintain the reaction temperature. The reaction mixture containing tris(bromochloropropyl) phosphite was stirred for another half-hour. The temperature was raised to 130° C., maintained for 4 hrs., then cooled again to 60° C. To the reaction product were added 1000 ml. of benzene, charcoal and filter aid, and the mixture was stirred for an hour. The liquid phase was filtered off and the benzene removed by distillation. A clear, colorless, viscous liquid product of 3800 g. (86% yield) was obtained. The content of tris(bromochloropropyl) phosphite was found to be 1%. *Analysis.*—Calcd. for $C_9H_{15}Br_3Cl_3O_3P$: P, 5.6%. Found: P, 5.4%. Calcd. molecular weight 548; found, 540.

This example shows the utility of the bromoalkyl phosphorus compounds as flame retarding agents for a typical polypropylene, such as Escon 125 (Enjay Chemical Co.) which has a melt index of 6 g. per 10 min. at 230° C. The polymer was milled with varying percentages by weight of flame retardant (based on total composition weight) at 355–360° F. for 12–15 min. The 5″ x 0.5″ specimens were cut from a piece 6″ x 7″ x 0.075″, molded at 360° F. for 5 min. and tested according to the ASTM method D635–56T.

POLYPROPYLENE

| Retardant | Content, Weight percent | ASTM Rating (Self-Extinguishing Rate, in./sec.) |
|---|---|---|
| Bis(bromochloropropyl) bromochloropropylphosphonate | 1.95 | (1) |
| | 2.85 | 0.79/47 |
| | 3.70 | 0.52/32 |
| | 4.60 | 0.18/16 |
| Tris(2,3-dibromopropyl) phosphate | 3.80 | (1) |
| | 4.60 | 0.34/26 |
| | 5.80 | 0.22/15 |
| | 6.90 | 0.09/15 |
| Bis(bromoethyl) bromoethylphosphonate | 3.00 | (1) |
| | 5.40 | 0.35/53 |
| | 6.50 | 0.27/24 |
| Tris(bromochloropropyl) phosphate | 4.90 | (1) |
| | 5.90 | 0.36/28 |
| | 7.40 | 0.33/16 |

[1] Burning.

In the above table the samples reported as "burning" all show marked flame-retardance as compared to untreated polypropylene. If the specimens were self-extinguishing, the extent of burning and the time of extinguishing are reported.

A similar series of tests was performed with these agents, employing ASTM method D568–56T. The test specimens were cut from a piece, 8″ x 11″ x 0.040″, molded at 360° F. for 5 min. The following results were obtained from the burning tests:

POLYPROPYLENE

| Retardant | Content, Weight percent | ASTM Rating (Extinguishing time in seconds) |
|---|---|---|
| Bis(bromochloropropyl)bromo-chloropropylphosphonate | 1.95 | SE (10) |
|  | 2.85 | SE (5.3) |
|  | 3.8 | SE (3) |
|  | 4.6 | NB |
| Tris(2,3-dibromopropyl)-phosphate | 3.8 | SE (4.75) |
|  | 4.6 | SE (1.7) |
| Bis(bromoethyl)bromoethylphos-phonate | 2.4 | SE (48.3) |
|  | 2.7 | SE (24.75) |
|  | 4.1 | SE (8.75) |
| Tris(bromochloropropyl)-phosphate | 4.1 | SE (6.2) |
|  | 4.9 | SE (5) |
|  | 5.9 | SE (3) |
| Tris(bromochloropropyl)-phosphite | 6.4 | SE (4) |

EXAMPLE 8

This example shows the unexpected retention of yield strength upon incorporating the bis(bromochloropropyl) bromochloropropylphosphonate prepared in Example 7 and tris(bromochloropropyl phosphite with polypropylene, at various loading levels.

POLYPROPYLENE

| Retardant | Weight percent | Average Yield Strength, p.s.i. |
|---|---|---|
| None | 0.0 | 4,850 |
| Phosphonate | 3.2 | 4,740 |
|  | 6.4 | 4,460 |
| Phosphite | 2.98 | 4,530 |
|  | 5.25 | 4,348 |

EXAMPLE 9

This example shows the overall effect of adding the bis(bromochloropropyl) bromochloropropylphosphonate prepared in Example 7 to a typical polybutene at three loading levels. (ASTM method D635–56T was used.)

POLYBUTENE

| Weight Percent of Retardant | Milling Temp., ° F. | Milling Time, min. | ASTM Rating | Yield Strength, p.s.i. |
|---|---|---|---|---|
| 0 |  |  | Burning | 1,895 |
| 3.37 | 300 | 12 | SE | 1,778 |
| 5.74 | 300 | 12 | SE | 1,753 |
| 7.98 | 300 | 12 | SE | 1,732 |

EXAMPLE 10

This example shows the effect of the bis(bromochloropropyl) bromochloropropylphosphonate prepared in Example 7 on the embrittlement temperature of polypropylene. (The temperatures were measured according to ASTM method D746–57T.)

POLYPROPYLENE

| Weight percent of retardant: | Embrittlement temp., ° C. |
|---|---|
| 0 | 29 |
| 1.95 | 24 |
| 3.90 | 21 |
| 5.40 | 21 |

This test measures the stiffness of polymers at reduced temperatures. (The lower the recorded temperature, the better the ability of the polymer to maintain its useful properties at low temperatures.)

As will be apparent to those skilled in the art, numerous other flame retardent resin compositions based upon different resins and containing different amounts of the illustrated flame retardants can be made without departing from the spirit of the invention or the scope of the following claims.

We claim:

1. A flame retardant non-filamentary plastic composition which comprises (1) a polymer selected from the group consisting of polystyrene, polypropylene and polybutene, and (2) 0.1–12 parts by weight per 100 parts of plastic, of flame retardant selected from the group consisting of (a) bis(bromohalopropyl) bromohalopropylphosphonates in which the bromohalopropyl radicals are each selected from the group consisting of 1-bromo-3-halo-2-propyl, 2,3-di-bromo-1-propyl, 2-bromo-3-chloro-1-propyl and 2-chloro-3-bromo-1-propyl and (b) polyphosphonates formed by the intermolecular reaction of the said bis(bromohalopropyl) bromohalopropylphosphonates and tris(bromohalopropyl) phosphites in which the bromohalopropyl radicals are selected from the group consisting of 1-bromo-3-halo-2-propyl, 2-bromo-3-halo-1-propyl and 2-halo-3-bromo-1-propyl where halo is always bromine or chlorine.

2. The flame retardant non-filamentary plastic composition of claim 1 in which the plastic is polystyrene and in which 1–5 parts by weight, per 100 parts of polystyrene, of flame retardant are present.

3. The flame retardant non-filamentary polystyrene composition of claim 2 in which the polystyrene is in the form of rigid foam.

4. The flame retardant non-filamentary plastic composition of claim 1 in which the plastic composition is polyolefin selected from the group consisting of polypropylene and polybutene and in which the flame retardant is a monophosphorus compound.

5. The flame retardant non-filamentary plastic composition of claim 1 in which the plastic is a polyolefin selected from the group consisting of polypropylene and polybutene and as flame retardant 2–12% by weight of phosphonate flame retardant.

6. A flame retardant polyolefin composition which comprises a polyolefin selected from the group consisting of polypropylene and polybutene, and as a flame retardant 2–12% by weight of a reaction product containing bis(dihalopropyl) dihalopropylphosphonate in which the dihalopropyl radicals are selected from the group consisting of 1,3-dibromo-2-propyl, 2,3-dibromo-1-propyl, 1,3-dichloro-2-propyl, 2,3-dichloro-1-propyl, 1-bromo-2-propyl, 2-bromo-1-propyl and 2-bromo-3-propyl and at least 25 mole percent of the halogen is bromine, and polyphosphonates formed by intermolecular reaction of the corresponding phosphites.

References Cited

UNITED STATES PATENTS

| 3,027,349 | 3/1962 | Bahr et al. | 106—15 |
| 3,242,124 | 3/1966 | Lowes | 260—29.6 |
| 2,816,004 | 12/1957 | Rossin et al. | 106—15 X |
| 3,250,827 | 5/1966 | Schroll | 106—15 X |
| 3,266,918 | 8/1966 | Schappel et al. | 106—15 X |

JAMES A. SEIDLECK, *Primary Examiner.*

J. B. EVANS, *Assistant Examiner.*